United States Patent
Berger et al.

(10) Patent No.: US 8,231,389 B1
(45) Date of Patent: Jul. 31, 2012

(54) REAL-TIME OBSERVATION ASSESSMENT WITH PHONEME SEGMENT CAPTURING AND SCORING

(75) Inventors: Lawrence Jason Berger, New York, NY (US); Anouk Markovits, New York, NY (US); Susan Kare, San Francisco, CA (US); David Barratt Stevenson, New York, NY (US); Justine Elizabeth Roberts, Brooklyn, NY (US)

(73) Assignee: Wireless Generation, Inc., New York, NY (US)

( * ) Notice: Subject to any disclaimer, the term of this patent is extended or adjusted under 35 U.S.C. 154(b) by 1732 days.

(21) Appl. No.: 11/117,696

(22) Filed: Apr. 29, 2005
(Under 37 CFR 1.47)

Related U.S. Application Data

(60) Provisional application No. 60/566,173, filed on Apr. 29, 2004.

(51) Int. Cl.
*G09B 3/00* (2006.01)
(52) U.S. Cl. ........ 434/322; 434/156; 434/365; 434/319; 434/308
(58) Field of Classification Search .................. 434/157, 434/322, 156, 365, 308, 318
See application file for complete search history.

(56) References Cited

U.S. PATENT DOCUMENTS

| | | | |
|---|---|---|---|
| 5,344,326 A | 9/1994 | Ferris | |
| 5,594,640 A * | 1/1997 | Capps et al. | .......... 715/235 |
| 5,618,182 A | 4/1997 | Thomas | |
| 5,658,161 A | 8/1997 | Roberts | |
| 5,663,748 A | 9/1997 | Huffman | |
| 5,692,906 A | 12/1997 | Corder | |
| 5,727,950 A | 3/1998 | Cook | |
| 5,778,404 A | 7/1998 | Capps | |
| 5,788,508 A | 8/1998 | Lee | |
| 5,796,681 A | 8/1998 | Aronzo | |
| 5,823,788 A | 10/1998 | Lemelson | |
| 5,864,869 A | 1/1999 | Doak | |
| 5,879,165 A | 3/1999 | Brunkow | |
| 5,885,087 A | 3/1999 | Thomas | |
| 5,947,747 A | 9/1999 | Walker | |
| 5,956,034 A | 9/1999 | Sachs | |

(Continued)

OTHER PUBLICATIONS

Narita, Shigeru et al.; "Development of Personal Communication agent for Students with Speech Difficulties"; 1997.

(Continued)

*Primary Examiner* — Xuan Thai
*Assistant Examiner* — Banafsheh Hadizonooz
(74) *Attorney, Agent, or Firm* — Fish & Richardson P.C.

(57) ABSTRACT

A real-time observation assessment system includes an assessment application that enables an assessor to administer a probe to a student, and to capture responses of the student, and to automatically score the captured responses. The assessment system includes a user interface of the assessment application. The user interface includes a first area of the user interface that displays a character sequence that is divided into multiple segments, where at least two of the multiple segments of the character sequence are separately selectable and a second area of the user interface that is divided into multiple segments corresponding to each segment of the character sequence in the first area, where each segment in the second area is separately selectable to enable capturing of different combinations of student responses reflecting selection of one or more of the segments in the second area. A scoring module enables a score to be calculated based on the selected segments according to scoring rules for the probe.

42 Claims, 9 Drawing Sheets

U.S. PATENT DOCUMENTS

| | | | |
|---|---|---|---|
| 5,957,699 A | 9/1999 | Peterson | |
| 5,978,648 A | 11/1999 | George et al. | |
| 5,980,263 A | 11/1999 | Conover | |
| 5,991,594 A | 11/1999 | Froeber | |
| 6,086,382 A | 7/2000 | Thomas | |
| 6,088,730 A | 7/2000 | Kato | |
| 6,091,930 A | 7/2000 | Mortimer | |
| 6,146,147 A | 11/2000 | Wasowicz | |
| 6,178,308 B1 | 1/2001 | Bobrow | |
| 6,270,351 B1 | 8/2001 | Roper | |
| 6,299,452 B1 | 10/2001 | Wasowicz et al. | |
| 6,361,322 B1 | 3/2002 | Linden | |
| 6,405,167 B1 | 6/2002 | Cogliano | |
| 6,427,083 B1 | 7/2002 | Owen et al. | |
| 6,435,877 B2 | 8/2002 | Wasowicz | |
| 6,505,031 B1 | 1/2003 | Slider | |
| 6,511,324 B1 | 1/2003 | Wasowicz | |
| 6,514,084 B1 | 2/2003 | Thomas | |
| 6,585,517 B2 | 7/2003 | Wasowicz | |
| 6,592,379 B1 | 7/2003 | Stuppy | |
| 6,628,918 B2 | 9/2003 | Roschelle | |
| 6,676,412 B1 | 1/2004 | Masterson | |
| 6,676,413 B1 | 1/2004 | Best et al. | |
| 6,684,053 B2 | 1/2004 | Helmick et al. | |
| 6,705,872 B2 | 3/2004 | Pearson | |
| 6,729,885 B2 | 5/2004 | Stuppy | |
| 6,755,657 B1 * | 6/2004 | Wasowicz | 434/167 |
| 6,986,663 B2 * | 1/2006 | Budra et al. | 434/169 |
| 2001/0031457 A1 | 10/2001 | Pfenninger | |
| 2001/0046658 A1 | 11/2001 | Wasowicz | |
| 2001/0049085 A1 | 12/2001 | Wasowicz | |
| 2002/0001791 A1 | 1/2002 | Wasowicz et al. | |
| 2002/0076677 A1 | 6/2002 | Wasowicz et al. | |
| 2002/0164563 A1 | 11/2002 | Wasowicz et al. | |
| 2003/0016873 A1 | 1/2003 | Nagel | |
| 2003/0129576 A1 | 7/2003 | Wood et al. | |
| 2004/0006461 A1 * | 1/2004 | Gupta et al. | 704/200 |
| 2004/0043364 A1 | 3/2004 | Wasowicz | |
| 2004/0072131 A1 | 4/2004 | Wasowicz et al. | |
| 2004/0102973 A1 * | 5/2004 | Lott | 704/254 |
| 2004/0115600 A1 | 6/2004 | Wasowicz et al. | |
| 2004/0137412 A1 | 7/2004 | Wasowicz et al. | |
| 2004/0156271 A1 | 8/2004 | Brito | |
| 2004/0175679 A1 | 9/2004 | Wasowicz et al. | |

OTHER PUBLICATIONS

Apple Museum, Apple Computer Co., et al.; "eMate 300"; 1997.

Annenberg Media et al.; "Other Important Terms".

Sunburst.com et al.; "Middle School Assessment Indicators"; 2001; http://web.archive.org/web/20010715190726/www.sunburst.com/schoolhouse/learnerprofile/.

Roland H. Good III, and Ruth A. Kaminski. *DIBELS™ (Dynamic Indicators of Basic Early Literacy Skills™ 6th* Edition), Administration and Scoring Guide, Longmont, CO: Sopris West Educational Services, 2003.

* cited by examiner

REAL-TIME OBSERVATION ASSESSMENT WITH PHONEME SEGMENT CAPTURING AND SCORING

CROSS REFERENCE TO RELATED APPLICATIONS

This application claims the benefit of U.S. Provisional Application No. 60/566,173, filed Apr. 29, 2004, and titled "Literacy Skills Assessment," which is incorporated by reference.

TECHNICAL FIELD

This document relates to a real-time observation assessment with segment capturing and scoring.

BACKGROUND

Classrooms assessments are used by teachers as a powerful tool for measuring student skills (e.g., literacy skills) and improving student achievement. In general, an assessor (e.g., a teacher, an educator, or an administrator) administers a probe to a student or a group of students and marks down the student responses. After the probe is complete, the assessor goes back and scores the probe based on the student responses according to the scoring rules for that probe. In some probes, the scoring rules are complex and tedious to apply to the student responses, especially if the assessor is using a paper-based assessment program.

DESCRIPTION OF DRAWINGS

Like reference symbols in the various drawings may indicate like elements.

DETAILED DESCRIPTION

A real-time observation assessment system may be implemented on a mobile computing device, such as a laptop computing device or a hand-held computing device (e.g., a personal digital assistant (PDA)), to enable an assessor to administer one or more probes to a student or a group of students including capturing the student responses and automatically scoring the responses according to the scoring rules for the probe. The real-time observation assessment system may be implemented as a computer program that includes one or more probe modules.

In one exemplary implementation, a Phoneme Segmentation Fluency (PSF) probe is administered using a PSF probe module on a mobile computing device. The PSF probe is a direct measure of phonemic awareness. The assessor gives the student a word or a syllable with multiple phonemes (e.g., three to five phonemes) and asks the student to say the individual phonemes that make up the word. For example, the assessor says "sat" and the student says "/s/ /a/ /t/" to receive three possible points for the word. After the student responds, the assessor presents the next word. If the student does not say a phoneme segment after three seconds, the assessor moves on to the next word. The number of correct phonemes produced in one minute determines the final score.

The PSF probe module allows the assessor to record any possible response that a student may say as a part of this PSF probe. For example, the student may pronounce a phoneme correctly or incorrectly. In another example, the student may fail to segment each phoneme and instead pronounce a blended combination of more than one phoneme. In still another example, the student may repeat one or more phonemes, or simply repeat the whole word given by the assessor. The PSF probe software application is configured to capture these various responses. Additionally, the PSF probe module is configured to analyze each of the captured responses and, is capable of calculating the number of correct segments that a student has identified and scores the student accordingly.

Figure 1:
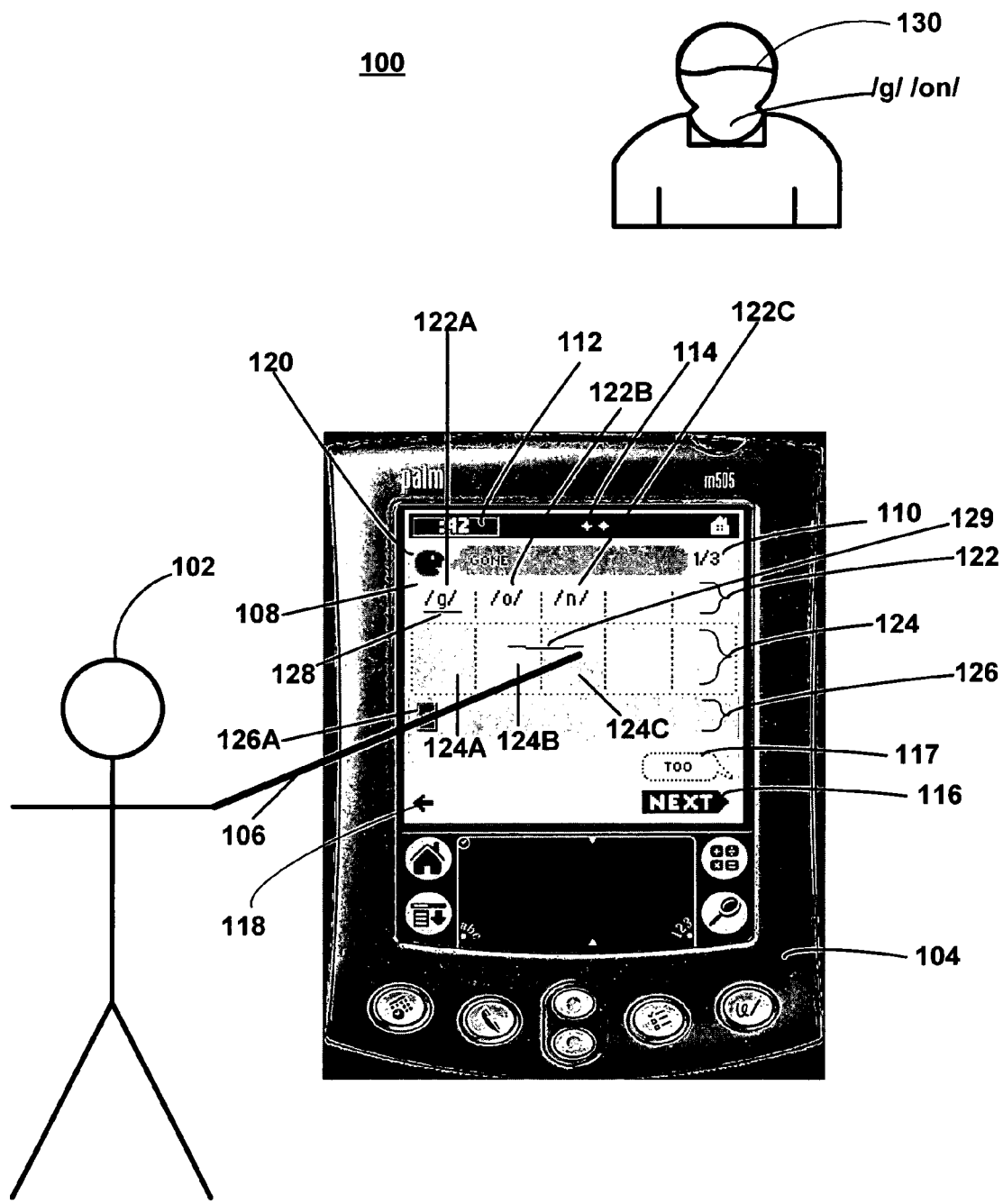
FIG. 1 is a block diagram of a real-time observation assessment system.

FIG. 1 is a block diagram of a real-time observation assessment system 100 where the assessor 102 uses a mobile computing device 104 and an input device 106 to administer a probe to a student 130. The mobile computing device may be a PDA (e.g., a Palm™ handheld device using the Palm OS®, a device using the BlackBerry® platform, or an HP iPAQ Pocket PC using the Windows Mobile™ software), a laptop computer, a mobile computer, a mobile phone (e.g., a Treo™ smartphone), a device, or other physical or virtual equipment or some combination thereof capable of responding to and executing instructions. In this particular example, the mobile computing device 104 is a Palm™ handheld device that uses the Palm OS®.

The assessor 102 may use an input device 106 to interact with the mobile computing device 104. The input device 106 may include a stylus, a pointing device or a finger that may operate on a touch screen. The input device 106 also may include a mouse, a keyboard, or a particular input device that is compatible with the mobile computing device 104.

The mobile computing device 104 includes a user interface 108 that displays the content of a probe. The mobile computing device 104 also may include a timer clock 112 that shows the elapsed time of the probe and a visual indicator 114 that assists the assessor 102 in tracking a student's response time to a question. As shown in FIG. 1, the timer clock 112 indicates that forty two seconds of the probe have elapsed. The visual indicator 114 may repeat a particular pattern for a pre-determined time. For example, the two diamond-shaped pattern may repeat every three seconds. Hence, if the assessor prompts the student with a question when the two diamond pattern is displayed, then the assessor knows to move on to the next question if the student does not respond by the time the next time the two diamond pattern is displayed.

The user interface 108 also may include a real-time score counter 110 to report a current score corresponding to the current question. In the example shown in FIG. 1, the student 130 has scored one point out of a total of three points. The score 110 may change when the assessor 102 captures an additional correct answer from the student 130 and/or if the assessor performs an undo gesture to undo an answer.

The user interface 108 also may include navigation controls 116 and 118 to navigate to different parts of the probe. For example, the navigation control 116 directs the user interface 108 to display a next part of the probe. The navigation control 118 directs the user interface 108 to display a previous part of the probe.

The user interface 108 also may include a prompt 120 that the assessor 102 uses to prompt a question or testing phrase to the student 130. In this example, the prompt is the word "gone". The assessor says the word "gone" as shown in the prompt 120.

The user interface 108 also includes a question area 122, a response capturing area 124 and a response records area 126. The question area 122 displays a character sequence in separately selectable segments 122A-122C. In one implementation, the character sequence is a word and the segments 122A-122C represent a phonetic breakdown of the word. The character sequence also may be referred to as other items throughout the detailed description such as, for example, a question or a testing phrase. Each segment may represent a targeted response that the student 130 is expected to make. For example, as shown in FIG. 1, the question area 122 segments the question word "Gone" into three phonemes, /g/ 122A, /o/ 122B, /n/ 122C, which are the phonemes that the student 130 is expected to identify. Each segment in the question area 122, i.e., 122A, 122B and 122C, may be selected (e.g., by tapping the segment with input device 106) to capture an incorrect response with respect to the phoneme. Further details are illustrated below in FIG. 2C. The segments 122A-122C also may be marked, for example, underlined, to provide an illustration of the student response that is captured in the response capturing area 124, as discussed below. In this example, mark 128 under the phoneme segment /g/ 122A, indicates that the student 130 has made a correct phoneme on the segment 122A, i.e., the phoneme /g/. The mark 128 is displayed following an input in the response capturing area 124.

The user interface 108 also includes a response capturing area 124 that is configured to allow the assessor to capture the student's responses using the input device 106. The response capturing area 124 in general allows the assessor 102 to easily record a student response into the mobile computing device 104. In one example, the response capturing area 124 is divided into multiple segments/square spaces, where each segment may be associated with a targeted segment right above the square space in area 122. More specifically, the square space 124A is associated with the target phoneme /g/ 122A, the square space 124B is associated with the target phoneme /o/ 122B, and the square space 124C is associated with the target phoneme /n/ 122C. Each response capturing segment 124A-124C is separately selectable. Input by the assessor 102 into one or more of the response capturing segments 124A-124C may cause events to occur in one or more of the other two areas, the question area 122 and the response records area 126.

The assessor 102 may record a student's response to a target phoneme in area 122 by marking on the associated square space in area 124. For example, the assessor 102 may drag the input device 106 from left to right inside of the square space 124A and/or tap the space 124A to capture that the student 130 has pronounced the target phoneme /g/ 122A. Similarly, the assessor 102 may make a left to right gesture on each of the segmented areas, i.e., 124B, 124C, to capture that the student 130 has responded the target phoneme 122B, 122C respectively.

In effect, the captured phoneme in the area 124 may then introduce a visual mark, for example, an underline 128, in the corresponding area in question area 122. The underline 128 may serve as a confirmation to a successfully captured student response. More specifically, when the student 130 responds with the target phoneme /g/ 122A, the assessor 102 marks in the associated square space 124A with the input device 106 in a left to right gesture and/or a tap to capture the phoneme response, and, as a result, a visual mark 128 appears underneath the target segment /g/ 122A, indicating the mobile computing device 104 successfully captured the gesture. The phoneme /g/ 122A is recorded and scored in the PSF probe module as the student's response.

Further, the assessor 102 may undo a captured response by using the input device 106 in a reverse direction, i.e. from right to left, on one or more phonemes that were captured earlier. Details of undoing a captured response are illustrated below in FIGS. 2D and 2E.

Additionally or alternatively, the captured phoneme also may be presented in another format and may be presented in a different area than the question area 122. In one implementation, a response records area 126 displays the captured responses in a series of selectable icons, for example, buttons. Each selectable icon (e.g., button) in general may display the content of a response. For example, for the response of phoneme /g/ 122A, a button "G" 126A illustrates the recorded response in an easy to read format in the response records area 126. Further, the selectable icons, when selected, allow the assessor 102 to undo a captured response. For example, the assessor 102 may use the input device 106 to select the button "G" 126A to undo the capturing of the phoneme "G". The selected button "G" 126A is then removed from the area 126. Additionally, the underline 128 under the phoneme /g/ 122A is also removed. The score 110 is recalculated and, for example, would display a new score of 0/3 (not shown).

Additionally, the area 124 is configured to record a student's response that comprises a combination of the target phonemes. In general, the assessor 102 may select the segments that make up the combination. In one example in FIG. 1, the student 130 responds by saying a phoneme /on/, which is a blended combination of the phoneme /o/ 122B and the phoneme /n/ 122C. The assessor 102 may, for example, use the input device 106 to drag a line 129 from left to right, across from the square space 124B to the square space 124C on the interface 108. The line 129 demonstrates the trace of the input device 106. Once the gesture is finished, i.e., the input device is lifted up from the interface 108, the combination of the phonemes /on/ is then recorded in the PSF probe module.

Similarly, in effect, the captured combination of the target phoneme /o/ 122B and /n/ 122C may show a visual mark of one continuous underline from underneath /o/ 122B to underneath /n/ 122C. A selectable icon may then be added in area 126, illustrating the blended phonemes "ON" on the selectable icon. An example of the combination phoneme marking is illustrated further in FIG. 2B.

Figure 2A:
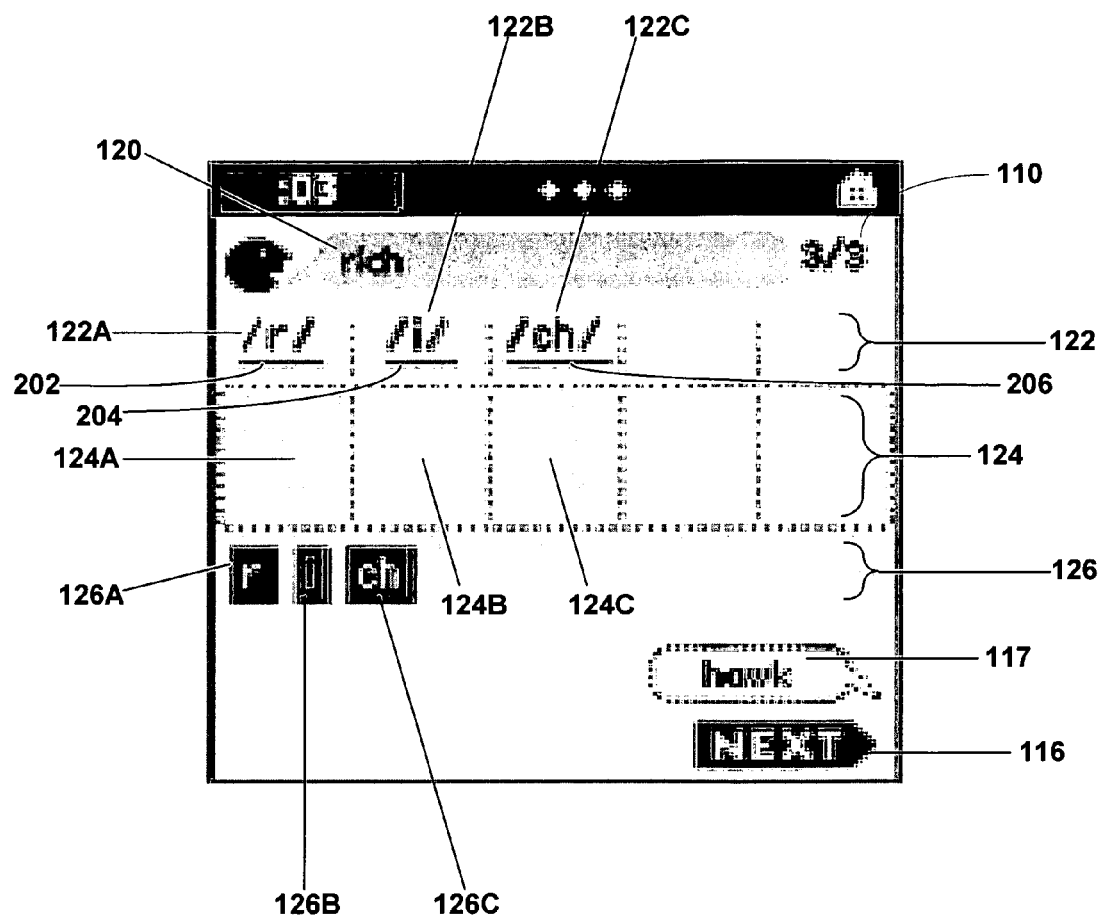
FIGS. 2A-2E are exemplary screen shots illustrating the capturing and scoring of a student's responses in a real-time observation assessment system.
Figure 2B:
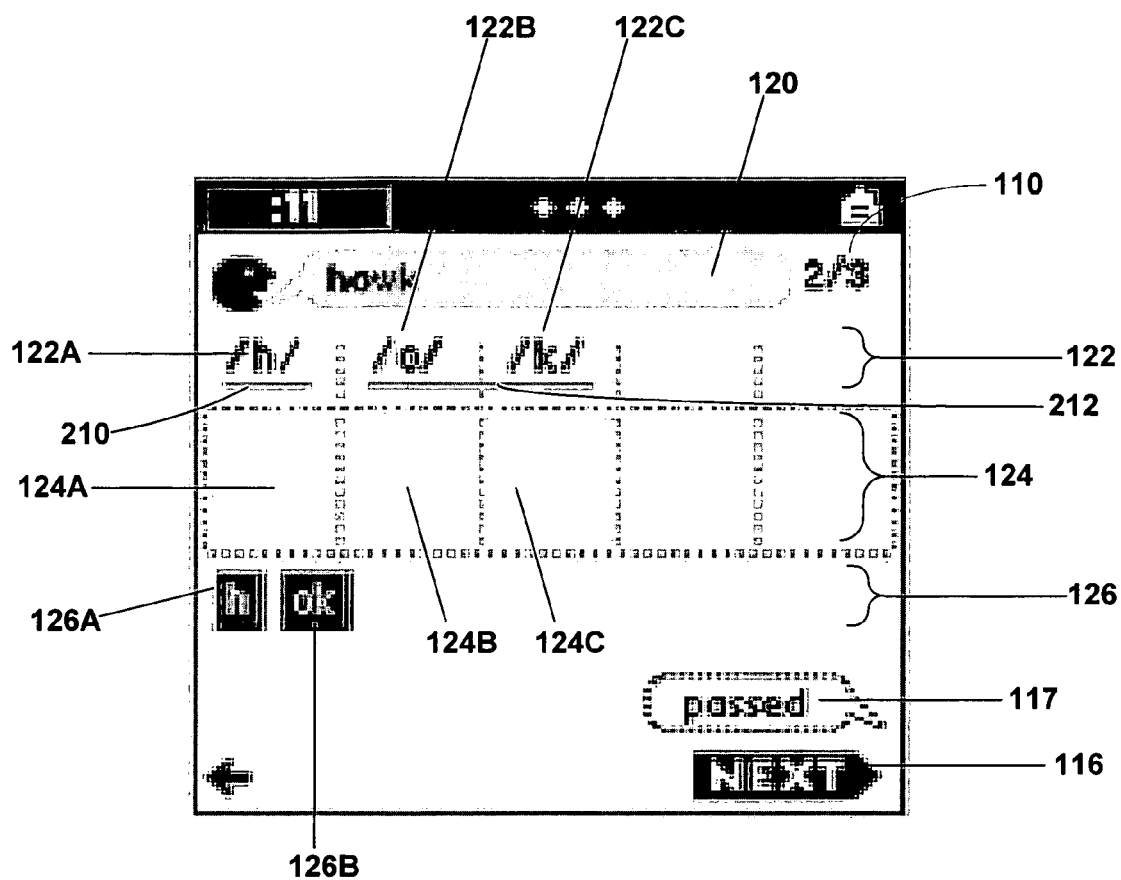
Figure 2C:
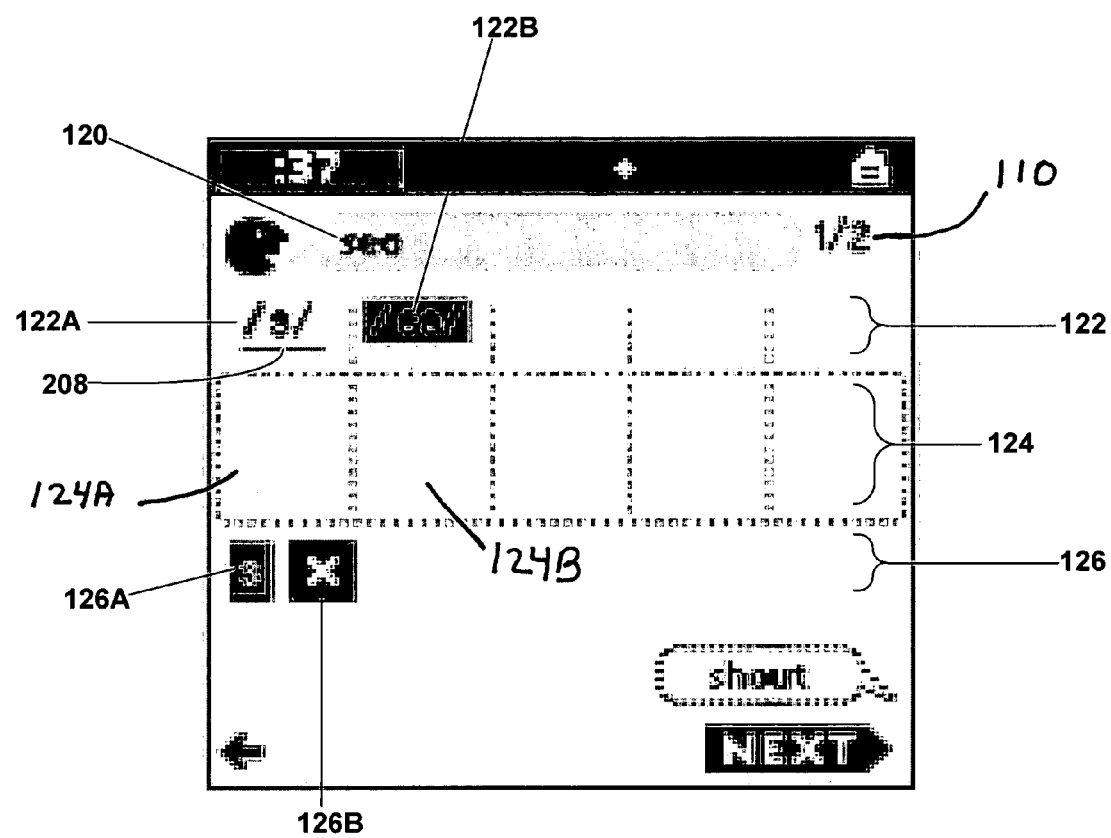

FIGS. 2A-2C are exemplary screen shots of user interfaces that capture and score a student response. FIG. 2A illustrates an example of the assessor 102 capturing each target phoneme from the student's response. In general, the assessor may capture each phoneme individually. In this example, the assessor 102 may prompt the student 130 with the question word "rich" as shown in prompt 120. The word "rich" includes three target phonemes /r/ /i/ /ch/, that the student 130 is expected to identify. The three target phonemes are shown in the question area 122, in three segments 122A, 122B, and 122C. The response capturing area 124 includes, for each target phoneme 122A-122C, a phoneme capturing square space 124A-124C, respectively, that are right underneath the associated target phoneme segment. The assessor 102 may select the phoneme capturing square space 124A-124 to capture a response associated with the target phonemes. In this example, the assessor 102 selects in the square space 124A-

124C and captures that the student 130 has successfully responded to the three target phonemes 122A-122C individually. The assessor 102 marks square space 124A when the student 130 correctly responds with the phoneme /r/ 122A. The assessor 102 marks the square space 124B when the student 130 correctly responds with the phoneme /i/ 124B and the assessor 102 marks in the square space 124C when the student 130 correctly responds with the phoneme /ch/ 124C.

As a result, the question area 122 then displays the captured student response with underlines 202, 204, and 206. An underline 202 demonstrates the capture of the phoneme /r/, an underline 204 demonstrates the capture of the phoneme /i/ and the underline 206 demonstrates the capture of the phoneme /ch/.

Additionally, the response records area 126 displays the captured responses in selectable buttons 126A-126C. The button 126A shows that the student 130 correctly responded to the phoneme /r/. The button 126B shows that the student 130 correctly responded the phoneme i, and the button 126C shows that the student 130 correctly responded to the phoneme /ch/.

As described above, the student 130 has responded correctly to each of the target phonemes, /r/ /i/ and /ch/. The PSF probe module may then give a score of 3 points out of a total of 3 points, as shown in 110, for the current question. The assessor 102 may then move on to the next part of the probe. A prompt 117 shows the next testing word "hawk". The assessor 102 may navigate to the next probe page for the next word "hawk" 117, for example, by using the input device 106 to select the "NEXT" navigation control 116.

FIG. 2B illustrates the capture of a combination of target phonemes. In this example, the assessor tests the word "hawk" 120. The question area 122 includes three targeted phonemes for the testing word "hawk", i.e., /h/ 122A, /o/ 122B, and /k/ 122C. The response capturing area 124 includes square spaces that are each associated with a targeted phoneme above respectively. In one example, the student 130 responds /h/ /ok/. The assessor 102 may capture the /h/ by marking in the square space 124A. The assessor may then capture the combination of phonemes /o/ and /k/ for the response /ok/, for example, by dragging input device 106 across from the square space 124B to the square space 124C.

As a result, the blended phoneme is captured. The captured phoneme combination may then be marked in question area 122. For example, an underline 210 indicates the capture of the phoneme /h/ and the underline 212 indicates the capture of the blended phonemes /o/ and /k/. Additionally, the response records area 126 may display the captured responses. For example, a selectable button "h" 126A displays the captured phoneme /h/ and a selectable button "ok" 126B displays the capture of the blended phonemes of /ok/. Further, the combination of phonemes /ok/ is automatically scored as one point and the phoneme /h/ is automatically scored as 1 point, according to the probe scoring rules. Thus, the score 110 reflects the automatic scoring of 2 points out of 3 total points.

FIG. 2C is a block diagram of another example of capturing and scoring a student's response. In this example, the student 130 may have incorrectly pronounced a phoneme. The assessor 102 may indicate the incorrectly pronounced phoneme by selecting the phoneme in the question area 122, for example, using input device 106. The incorrectly pronounced phoneme may then be recorded in the PSF probe module, and scored accordingly. The user interface 108 may reflect the recorded incorrectly pronounced phoneme. For example, the question area 122 may indicate the phoneme was incorrectly pronounced by highlighting the incorrect phoneme, and the response records area 126 may indicate the incorrectly pronounced phoneme by displaying an error mark for the phoneme.

In one example as shown in FIG. 2C, the assessor 102 prompts the word "sea" 120 to the student 130. The question area 122 shows /s/ 122A and /ea/ 122B as target phonemes for the word "sea". The response capturing area 124 includes a square space 124A to capture the phoneme /s/, and a square space 124B to capture the phoneme /ea/. The assessor 102 captures a correctly pronounced phoneme /s/ 122A, for example, by dragging the input device from left to right in a square space 124A. The phoneme 122A /s/ is then underlined with mark 208 to indicate the correctly pronounced phoneme.

The assessor 102 may capture an incorrectly pronounced sound for the phoneme /ea/ 122B. The assessor may select the phoneme /ea/ 122B in the question area 122. The phoneme /ea/ 122B is then highlighted to indicate an incorrect response to the phoneme /ea/ 122B. Additionally, the captured incorrect phoneme may be displayed in the response records area 126. For example, a selectable button "X" 126B may be added to the record response area 126.

Figures 2D, 2E:
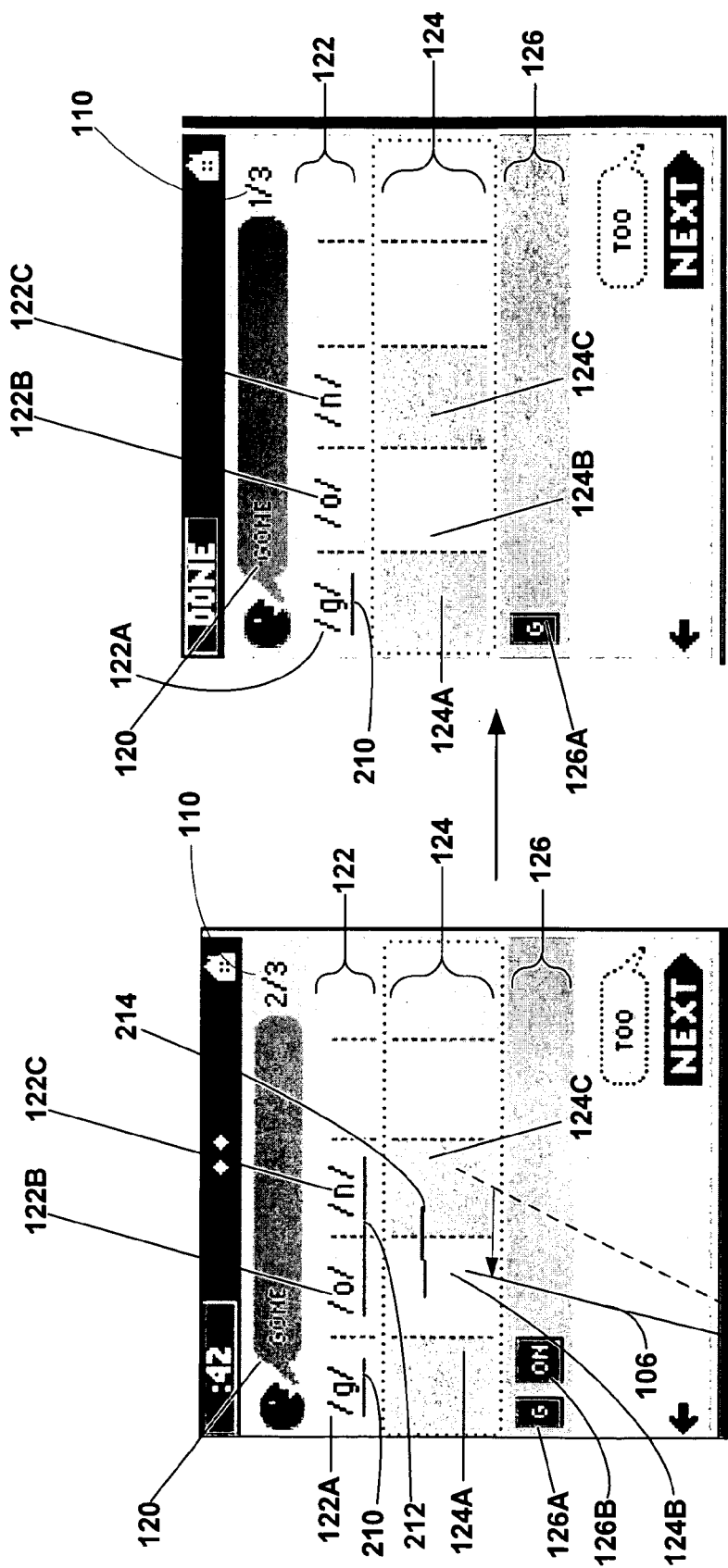

FIG. 2D and FIG. 2E are block diagrams illustrating undoing a captured response. In FIG. 2D, a testing word "Gone" 120 is prompted to the student. The question area 122 includes three phonemes for the prompted word "Gone", i.e. /g/ 122A, /o/ 122B and /n/ 122C. The assessor 102 has captured the student response of phonemes /g/ and /on/, as indicated by the underlines 210 and 212. Further, the captured phonemes /g/ and /on/ are displayed in the response records area 126 as selectable buttons "G" 126A and "ON" 126B, respectively. The score of the word is 2 points, for identifying two phonemes /g/ and /on/, out of a total of 3 points, as shown in the score counter 110.

In this example, the assessor 102 undoes the captured phoneme /on/. The assessor 102 may use the input device 106 to gesture across the phonemes /o/ and /n/ from right to left, i.e., marking from square space 124C to square space 124B, to undo the associated phonemes /n/ 122C and /o/ 122B, respectively. In another implementation, the assessor 102 also may select the selectable icon, e.g., the "ON" button 126B to undo the capturing of the phonemes /on/.

FIG. 2E is a block diagram illustrating a result of the undo action that was shown in FIG. 2D. In FIG. 2E, the prompted word "Gone" has three targeted phonemes /g/ 122A, /o/ 122B and /n/ 122C. The phoneme /g/ 122A is captured, as indicated by underscore 210, and the button "G" 126A in the response records area 126. The previously captured combination phoneme /on/ has been removed. The previous underline 212 under /o/ and /n/ in the question area 122 has been removed. The previous selectable icon, i.e., "ON" button 126B has been removed. Additionally, the score counter 110 displays a recalculated score of 1/3, one phoneme captured, i.e., phoneme /g/, out of the total of three phonemes.

In addition to the PSF probe module automatically scoring each word based on the captured responses, the probe module calculates and maintains an overall score for all of the probe questions. The overall score may be used to calculate various metrics. Additionally, a reporting module may display and generate reports on a per student or classroom basis for each probe or a group of probes on the mobile computing device. The captured responses and scoring information may be uploaded to another computing device, such as a desktop personal computer and/or a web server, to make the detailed probe information available to assessors and other personnel on the desktop personal computer and/or the Internet. The uploaded information may be analyzed and processed in numerous ways and may be used to generate reports.

Tables 1-10 below illustrate exemplary scoring rules that may be implemented so that the captured student response is automatically scored in accordance with the appropriate rules.

Correct Segmentation. A correct sound segment is any different, correct part of the word represented by sounds that correspond to the word part. For example, the sound /t/ is a correct sound segment of "trick," as are /tr/ and /tri/ (see Table 1).

TABLE 1

| Word | Student Says | Scoring Procedure | Correct Segments |
|---|---|---|---|
| trick | "t...r...i...k" | /t/ /r/ /i/ /k/ | 4/4 |
| cat | "k...a...t" | /k/ /a/ /t/ | 3/3 |

Schwa Sounds. Schwa sounds (/u/) added to consonants are not counted as errors. Some phonemes cannot be pronounced correctly in isolation without a vowel, and some early learning of sounds includes the schwa. For example, if the word is "trick," and the student says "tu...ru...i...ku," they would receive 4 of 4 points (see Table 2).

TABLE 2

| Word | Student Says | Scoring Procedure | Correct Segments |
|---|---|---|---|
| trick | "tu...ru...i...ku" | /t/ /r/ /i/ /k/ | 4/4 |
| cat | "ku...a...tu" | /k/ /a/ /t/ | 3/3 |

Additions. Additions are not counted as errors if they are separated from the other sounds in the word. For example, if the word is "trick," and the student says "t...r...i...ck...s," they would receive 4 of 4 points (see Table 3).

TABLE 3

| Word | Student Says | Scoring Procedure | Correct Segments |
|---|---|---|---|
| trick | "t...r...i...ck...s" | /t/ /r/ /i/ /k/ | 4/4 |
| cat | "s...c...a...t" | /k/ /a/ /t/ | 3/3 |

Articulation and Dialect. The student is not penalized for imperfect pronunciation due to dialect, articulation, or second language interference. For example, if the student consistently says /th/ for /s/, and he or she says /r/ /e/ /th/ /t/ for "rest," he or she should be given credit for correct segmentation. This is a professional judgment and should be based on the student's responses and any prior knowledge of his/her speech patterns (see Table 4).

TABLE 4

| Word | Student Says | Scoring Procedure | Correct Segments |
|---|---|---|---|
| rest | "r...e...th...t" | /r/ /e/ /s/ /t/ | 4/4 |

Sound Elongation. The student may elongate the individual sounds and run them together as long as it is clear he or she is aware of each sound individually. For example, if the student says, "rrrrreeeeesssstttt," with each phoneme held long enough to make it clear they know the sounds in the word, they would receive credit for 4 phonemes correct. This is a professional judgment and should be based on the student's responses and prior knowledge of the student's instruction. When in doubt, no credit is given (see Table 5).

TABLE 5

| Word | Student Says | Scoring Procedure | Correct Segments |
|---|---|---|---|
| rest | "rrrrreeeeesssstttt" | /r/ /e/ /s/ /t/ | 4/4 |

No Segmentation. If the student repeats the entire word, no credit is given for any correct parts. For example, if the word is "trick," and the student says "trick," underline the entire word. No points will be awarded (see Table 6).

TABLE 6

| Word | Student Says | Scoring Procedure | Correct Segments |
|---|---|---|---|
| trick | "trick" | /t/ /r/ /i/ /k/ | 0/4 |
| cat | "cat" | /k/ /a/ /t/ | 0/3 |

Incomplete Segmentation. The student is given credit for each correct sound segment, even if they have not segmented to the phoneme level. Use the underline to indicate the size of the sound segment. For example, if the word is "trick," and the student says "tr...ick," they would receive 2 of 4 points (see Table 7).

TABLE 7

| Word | Student Says | Scoring Procedure | Correct Segments |
|---|---|---|---|
| trick | "tr...ick" | /t/ /r/ /i/ /k/ | 2/4 |
| cat | "c...at" | /k/ /a/ /t/ | 2/3 |

Overlapping Segmentation. The student receives credit for each different, correct sound segment of the word. Thus, if the word is "trick," and the student says "tri...ick," the student would receive 2 of 4 points because /tri/ and /ick/ are both different, correct sound segments of "trick" (see Table 8).

TABLE 8

| Word | Student Says | Scoring Procedure | Correct Segments |
|---|---|---|---|
| trick | "tri...ick" | /t/ /r/ /i/ /k/ | 2/4 |
| cat | "ca...a...at" | /k/ /a/ /t/ | 3/3 |

Omissions. The student does not receive credit for sound segments that are not produced. If the student provides the initial sound only, be sure to wait 3 seconds for elaboration. For example, if the word is "trick," and the student says "tr," you must wait 3 seconds before presenting the next word (see Table 9).

TABLE 9

| Word | Student Says | Scoring Procedure | Correct Segments |
|---|---|---|---|
| trick | "tr...(3 seconds)" | /t/ /r/ /i/ /k/ | 1/4 |
| cat | "c...t" | /k/ /a/ /t/ | 2/3 |

Segment Mispronunciation. The student does not receive credit for sound segments that are mispronounced. For example, if the word is "trick," and the student says "t . . . r . . . i . . . ks," they would receive no credit for /ks/ because there is no /ks/ sound segment in the word "trick" (see Table 10).

TABLE 10

| Word | Student Says | Scoring Procedure | Correct Segments |
|---|---|---|---|
| trick | "t . . . r . . . i . . . ks" | /t/ /r/ /i/ ▨ | 3/4 |
| cat | "b . . . a . . . t" | ▨ /a/ /t/ | 2/3 |

Figures 3A, 3B:
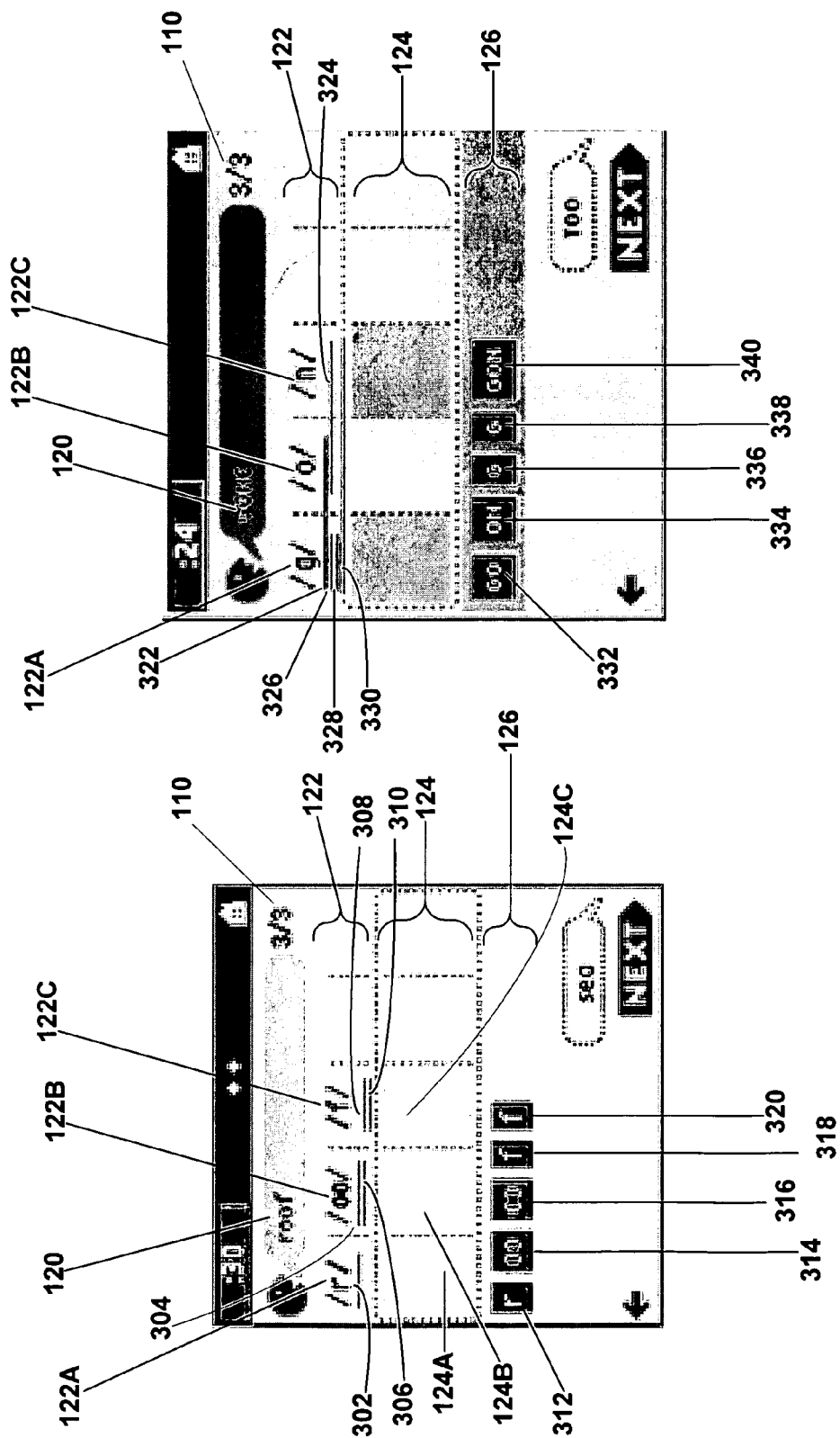
FIGS. 3A-3B are exemplary screen shots illustrating the capturing and scoring of a student's responses in a real-time observation assessment system.

FIG. 3A and FIG. 3B illustrate capturing one or more repeats of the same phoneme in a student's response and the scoring of the captured phonemes with repeats. In practice, the student's response may include combinations, repeats and overlaps of multiple phonemes.

In one example as shown in FIG. 3A, the prompted word "roof" 120 includes three phonemes, as shown in question area 122, /r/ 122A, /oo/ 122B and /f/ 122C. The student 130 says, /r/ /oo/ /oo/ /f/ /f/, with repeats of the phoneme /oo/ and /f/. The assessor 102 captures the repeating phonemes /oo/ and /f/, for example, by dragging the input device from left to right twice each on the square space 124B and 124C in the response capturing area 124. As a result, the question area 122 includes the captured phonemes as shown in underlines 302, 304, 306, 308 and 310. The repeated phoneme /oo/ has multiple underlines 304 and 306. Similarly, the repeated phoneme /f/ has multiple underlines 308 and 310. Additionally, the response records area 126 displays the captured phonemes, as illustrated in selectable icons 312-320, with repeated selectable icons 314 and 316 for the repeated phoneme /oo/ and repeated selectable icons 318 and 320 for the repeated phoneme /f/. In one implementation, the repeated phonemes are considered correct capture of the phonemes. The PSF probe module scores the answer as capturing the 3 targeted phonemes /r/ /oo/ /f/. The score counter 110 shows the score of 3 points out of a total of 3 points, 3/3.

In another example, as shown in FIG. 3B, the PSF probe module captures both repeat and overlapping of phonemes and scores the response accordingly. In this example, the testing word is "Gone" as shown in the prompt area 120. The question area 122 includes the three targeted phonemes /g/ 122A, /o/ 122B and /n/ 122C. The question area 122 includes underlines 322-330 that shows the captured phonemes of /go/ 322, /on/ 324, /g/ 326, /g/ 328, /gon/ 330. The response records area 126 includes the captured phonemes in selectable icons, button "GO" 332, button "ON" 334, button "G" 336, button "G" 338, and button "GON" 340. In this example, based on the scoring criteria for overlapping segmentation (e.g., see Table 8), the captured phonemes /go/ /on/ and /g/ each score one point. Thus, the current score is 3 point out of a total of 3 points, as shown in score counter 110. The last captured segment, /gon/ 330, is not scored as a point, since it does not show any segmentation ability on the part of the student.

Figure 4:
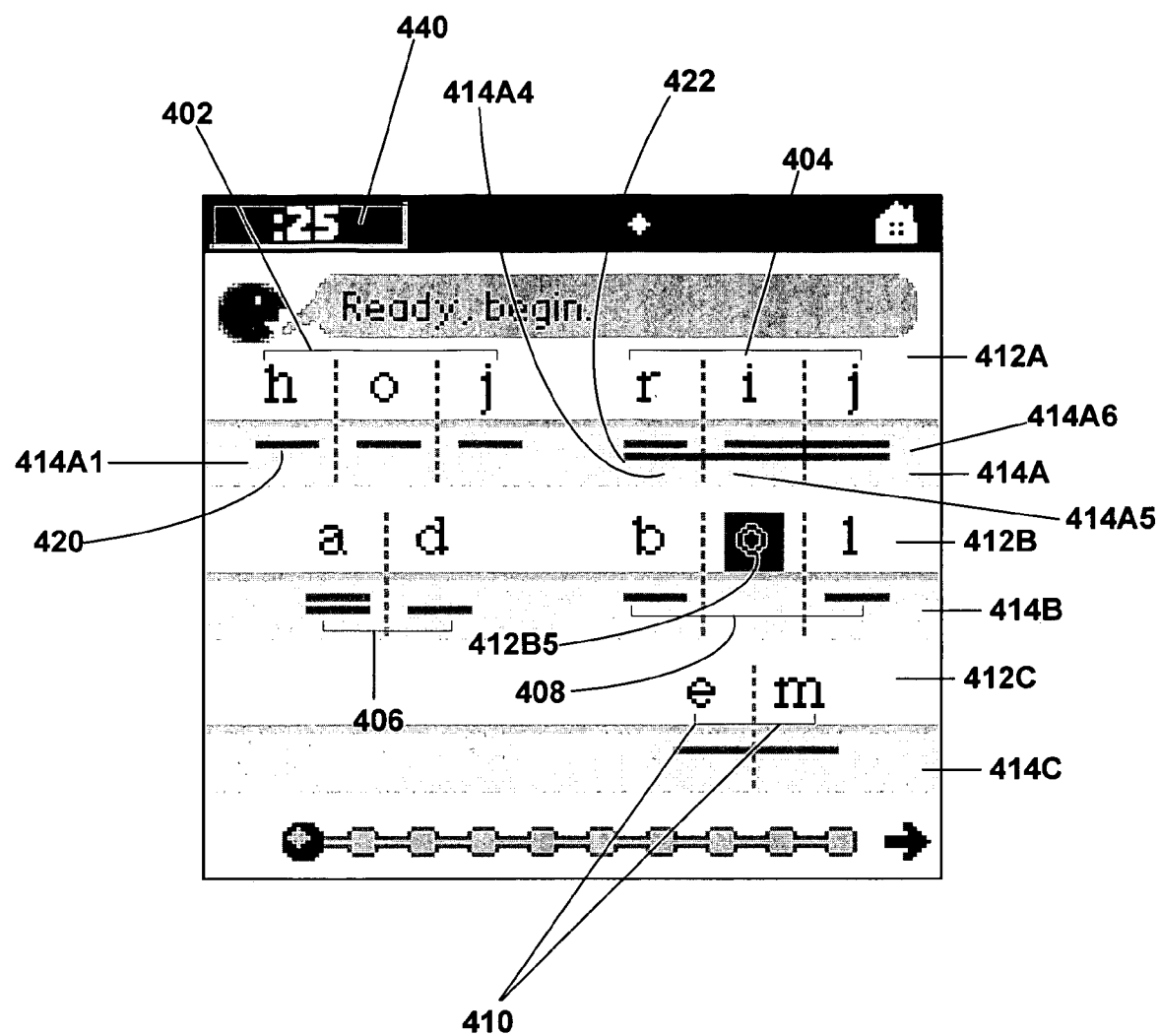
FIG. 4 is an exemplary screen shot illustrating the capturing and scoring of a student's responses in a real-time observation assessment system.

FIG. 4 illustrates an exemplary implementation of a Nonsense Word Fluency (NWF) probe module that applies response capturing and scoring features similar to the PSF probe module. In a NWF probe, a student 130 is presented a page (not shown) of many randomly ordered nonsense words that also are displayed to the assessor on the mobile computing device (e.g., "hoj" 402, "rij" 404, "ad" 406, "bol" 408, "em" 410). The student is asked to produce verbally the individual letter sound of each letter or verbally produce, or read, the whole nonsense word. For example, if the stimulus word is "hoj" the student could say /h/ /o/ /j/ or say the word /hoj/ to obtain a total of three letter-sounds correct. The student 130 is allowed one minute to produce as many letter-sounds as he/she can. The score is the number of letters that the student 130 names correctly in one minute. If the student 130 hesitates for 3 seconds or longer on one letter, the assessor 102 points to the next letter and scores the letter as incorrect.

In practice, the student response may include individual letters, a combination of letters, repetition of one or more letters and/or repetition of a whole nonsense word. The NWF probe module is configured to capture the possible types of responses and score the response accordingly. Referring to FIG. 4, each testing word 402-410 is segmented into individual letters and is displayed in a question area, for example, a row 412A, a row 412B and a row 412C. A response capturing area, which includes rows 414A, 414B and 414C that are right underneath the question area, i.e., rows 412A-412C. The response capturing area rows 414A-C are segmented in the same manner as the question area rows 412A-412C. Each segment in the response capturing area is associated with the segment/letter right above it in the question area.

The assessor 102 may capture each of the segments/letters that the student 130 says in the question area 412A-412C by selecting the associated segment in the response capturing area 414A-414C. For example, the assessor may capture the "h" by dragging the input device from left to right and/or tapping in the segment 414A1. In another example, the assessor 102 may drag the input device from segment 414A4 to 414A6 to capture the repeating of the whole word "rij". In yet another example, the assessor may select a letter, e.g., the letter "o" in 412B5 to indicate an incorrect response by the student.

As a result of capturing the letters, a visual mark(s) may appear to indicate the captured letter(s). For example, an underline 420 under the captured letter "h" in the question area 414A1 indicates the capturing of the letter "h". In another example, the underline 422 that is across from 414A4-414A6 indicates the capture of the whole word "rij". In still another example, the letter "o" 412B5 is highlighted to indicate the incorrect response to the letter "o".

Figure 5:
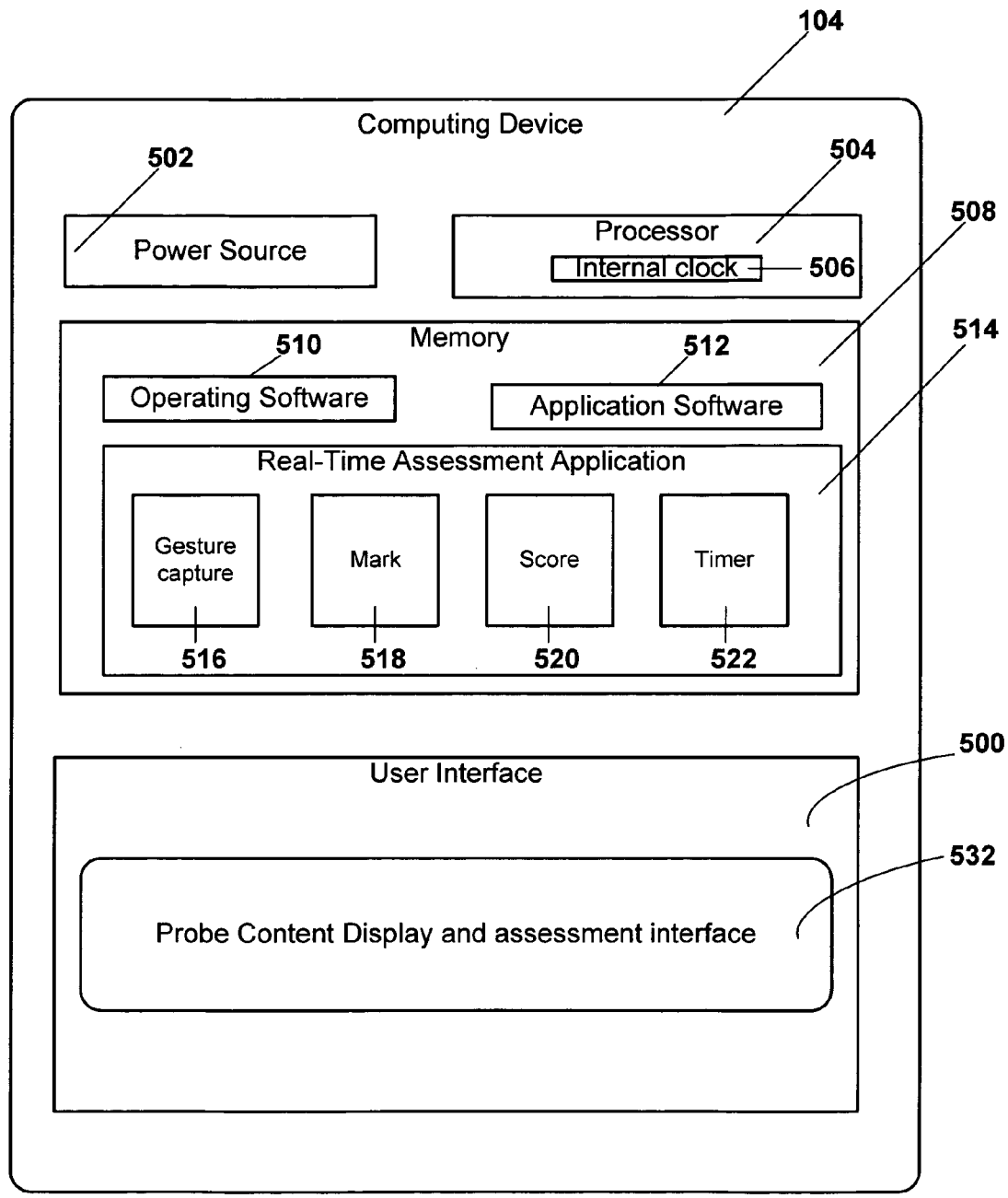
FIG. 5 is an exemplary block diagram of a real-time observation assessment system.

The systems and processes described above in FIGS. 1-4 and below in FIG. 6 may be implemented using hardware, software, or a combination of hardware and software and may be implemented in one or more computer systems or other processing systems. For example, FIG. 5 is an exemplary block diagram of the mobile computing device 104. The mobile computing device 104 includes a user interface module 500 that is operable to interact with the user to display content, receive inputs and display output to the user.

The user interface module 500 provides the assessor 102 an interface to interact with the mobile computing device 104 to obtain information and services. As discussed earlier, the user interface module 500 may provide the assessor 102 with a probe's content, timing and an interface to administer probes including capturing a student's responses so that the responses may be scored automatically.

The mobile computing device 104 generally includes a power source 502, a processor 504, and a memory 508. The power source 502 provides power for the computing device 104. The power source 502 may be batteries, rechargeable batteries for the particular mobile device or an AC source that may be connected to an electric outlet.

The processor 504 may be a single processor or multiple processors that the mobile computing device 104 uses to execute software. The processor 504 processes instructions and data received from a software application. The processor 504 may include an internal clock 506 that provides timing signals to the processor when executing instructions. The internal clock 506 also may provide the mobile computing device 104 with time information, for example, to be referenced to by software applications to track time.

The memory 508 stores instructions and data for the mobile computing device 104. The memory 508 includes operating system software 510 and one or more application programs 512. The operating system software 510 manages the other software programs and resources in the mobile computing device 104. The operating system software 510 may be an operating system that is specific to the mobile computing device.

The computing device 104 may include one or more application programs 512 that are configured to complete certain tasks. For example, the application program 512 may be a note pad application that allows user to write down notes or an address book that allows user to record email, phone and address information for a number of people or places. As an assessment tool, the mobile computing device 104 includes one or more real-time assessment applications 514, which has one or more probe modules including, among others, a PSF probe module and a NWF probe module that is configured to interact with the assessor 102 to administer and assess the student 130. The real-time assessment application 514 may reference the internal clock 506 of the processor 504 to obtain timing information for a timing component that administers the time.

The real-time assessment application 514 may include a gesture capture module 516 that captures the gestures or movements of the input device 106. In general, the gesture capture module 516 reads user inputs and translates the user input into data and commands that the real-time assessment application 514 processes. For example, the gesture capture module 516 captures dragging, tapping, and other selection-type movements of the input device 106 on the user interface 108 of FIG. 1, including the direction of the movements, and the position of the starting point and the ending point of the movements. The gesture capture module 516 may identify a selection input on a phoneme or a selectable icon. The gesture capture module 516 translates this gesture into a command. For example, the gesturing capture module 516 translates a left to right movement into a command to capture one or more phonemes, translates a right to left movements as an undo capture command of the associated phonemes, translates the selection of a phoneme as an error mark on the phoneme, and translates the selection of a selectable button as an undo of the captured phonemes.

The real-time assessment application 514 also includes a marking module 518 that marks the captured responses on the user interface 108. The marking module generally outputs representations of the captured inputs made by the assessor 102 on the computing device 104. For example, the marking module 518 underlines the phonemes that are captured by the gesture capturing module 516. The marking module 518 may add selectable icons representing the captured phonemes or incorrectly pronounced phonemes in the response records area (126 of FIG. 1).

The real-time assessment application 514 also includes a scoring module 520 that calculates a score based on the captured responses. The scoring module 520 generally calculates a real-time score based on pre-defined scoring criteria. For example, the scoring module 520 may analyze a newly captured response and determine if a new phoneme is identified, and if so, add a point to the total score or if the new response is a repeat of an already identified phoneme, the scoring module 520 keeps the score unchanged. In another example, if the user input is an undo to a captured phoneme, the scoring module 520 may adjust the score, for example, to remove the score that the previously captured phonemes has gained. The scoring module 520 also calculates and maintains an overall score for each probe that is administered. The individually-scored questions and the overall score for each probe may be analyzed and used to calculate various types of reporting metrics.

The real-time assessment application 514 also includes a timer module 522 that provides timing information to the assessor 102. The timer module 522 generally assists the assessor to control the overall time elapsed for an active probe and/or assists the assessor to control the time passed between the student's responses. In one example, the timer module 522 provides the probe time in a timer 112 in the user interface 108 of FIG. 1. In another example, the timer module 522 provides timing information to refresh the visual indicator 114 on the user interface 108 of FIG. 1 to change the displayed patterns, for example, every second.

Finally, the real-time assessment application 514 interacts with the user through a probe content display and assessment interface module 532 in the user interface 500. The probe content display and an assessment interface 532 may include information of the probe that the assessor needs to administer the probe, for example, the prompt 120, the timer 112, the visual indicator 114 and the question area 122 in FIG. 1.

The probe content display and assessment interface module 532 also includes an assessment interface that allows the user to input student's responses. For example, the response capturing area 124, the selectable icons in the response records area 126, and the segmented trappable area in the question area 122. Also, the probe content display and an assessment interface 532 includes a real-time score counter 120 that reflects the real-time score of the probe.

Figure 6:
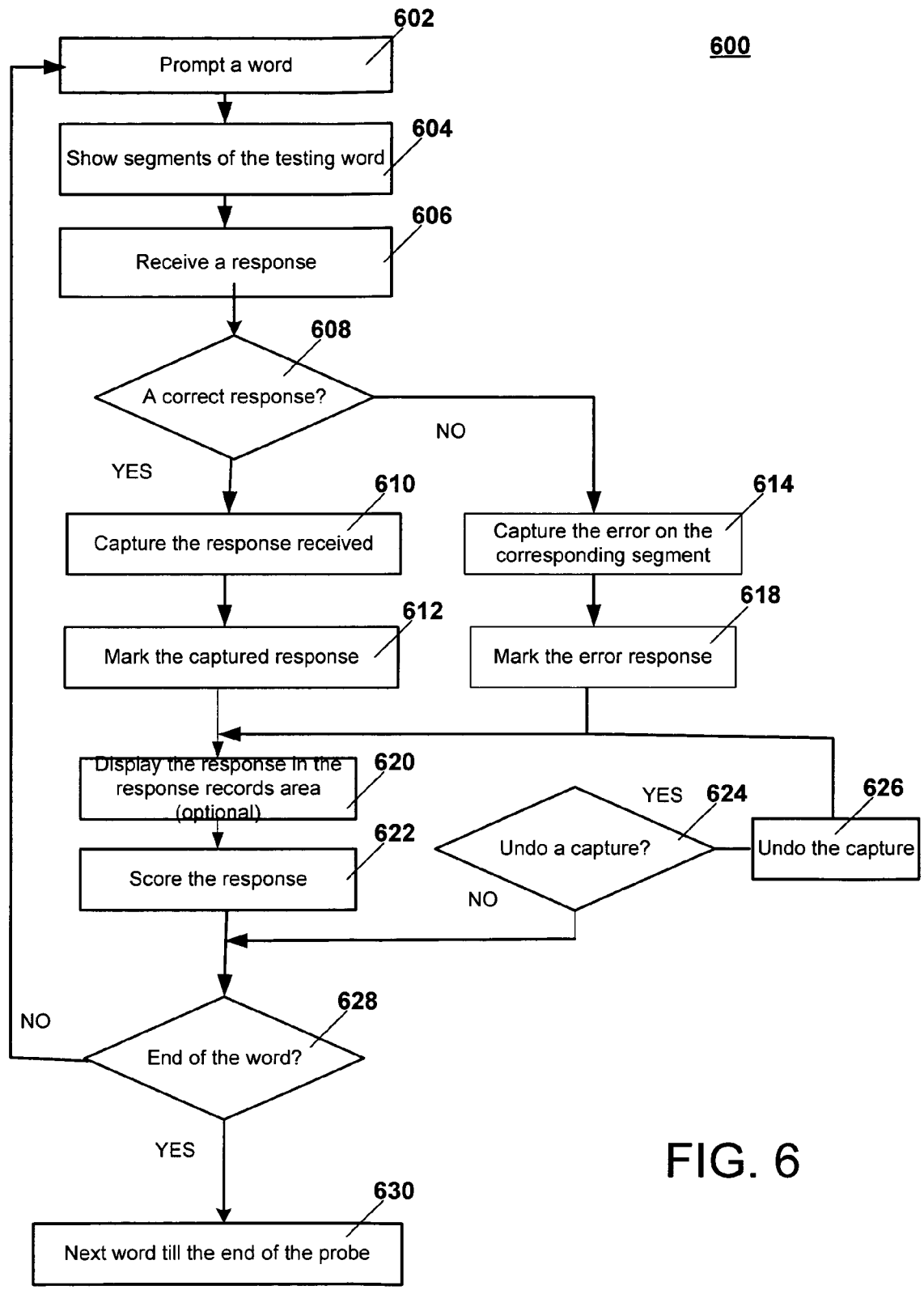
FIG. 6 is a flow chart of an exemplary process for performing a real-time observation assessment.

FIG. 6 is a flow chart of an exemplary process 600 for performing a real-time assessment. The exemplary process 600 provides an example of a real-time assessment using a PSF probe. A PSF probe starts when the assessor 102 prompts a testing word to the student (602). The prompted word may be on a display screen of the computing device 104, for example, a testing word "Gone" is displayed on the user interface 108 in the prompt area 120, as illustrated in FIG. 1.

The computing device 104 may show the segments of the word (604). For example, in the PSF probe, the testing word "Gone" is segmented into three target phonemes, /g/ /o/ /n/, and are shown in the question area 122 in FIG. 1 as segments 122A-122C. The assessor 102 may then receive a response from the student 130 (606). For example, the students says /g/ /on/. The assessor 102 determines if the student's response is a correct one (608). For example, the assessor matches the student's response with one or more of the target phonemes in the question area 122, and determines if the phoneme(s) is pronounced correctly.

And if so, the assessor 102 captures the response received using the computing device 104 (610). The assessor 102 marks the correctly pronounced phoneme(s) on the user interface 108. In one example, the assessor 102 drags an input device from left to right across the response capturing areas that are associated with the identified phonemes. More specifically, the assessor drags an input device across the square space 124B and 124C to capture the associated phonemes /o/ 122B and /n/ 122C, as shown in FIG. 1.

The computing device 104 may then mark the captured sounds, i.e., phonemes, on the user interface (612). In one example, the captured phonemes are marked in the question area 122 with underlines of the respective phoneme(s). Referring to FIG. 1, underline 128 marks the captured phoneme /g/ 122A.

On the other hand, if the assessor 102 determines that the student has incorrectly responded to a particular phoneme, the assessor 102 may capture the error on the corresponding phoneme segment (614). In one example, the assessor 102 selects the incorrectly pronounced phoneme in the question area 122 to capture the error. For instance, the assessor selects the /ea/ 122B as shown in FIG. 2C. As a result, the PSF probe module then marks the incorrectly pronounced phoneme on the user interface 108 (618). Following the above example, the incorrectly pronounced phoneme /ea/ 122B is highlighted, as shown in FIG. 2C.

In one implementation, the captured responses are displayed in the third area, for example, the response records area 126 as shown in FIG. 1 (620). For example, in FIG. 1, the captured phonemes are marked as selectable icons in the response records area 126, i.e., a button "G" 126A marks the captured phoneme /g/. An incorrectly pronounced phoneme is marked, for example, as an "X" button 126B as shown in FIG. 2C.

The computing device 104 then scores the response (622). The computing device 104 may analyze the captured phoneme(s) and calculate a score based on some scoring criteria. For instance, the example scoring rules described above in Tables 1-10 may be used to score the captured responses.

Meanwhile, if the assessor 102 undoes a captured response (624), the computing device 104 removes the captured phoneme from the record. For example, the assessor 102 may select a previously marked phoneme as incorrectly pronounced phoneme to undo the error captured. In another example, as shown in FIG. 2D and FIG. 2E, the assessor may drag the input device from right to left in the response capturing area 124 that is associated with the previously captured phonemes to undo the capture. In still another example, the assessor 102 may select a selectable icon that represents the phonemes that need to be undone in the response records area 126 to undo the capture. As a result, the marks on the previously marked phonemes are removed. For example, the underlines under the phonemes or the selectable icons representing the captured phonemes may be removed. The highlights of the captured incorrectly pronounced phonemes may be removed. The computing device 104 recalculates the current score based on the records of the captured responses after the undo process (622).

The assessor 102 then determines whether it is the end of testing the prompted word (628). For example, the student 130 may stop responding, or the testing time for the testing word, for example, three seconds, may have passed. The assessor may move on to test the next word of the probe and restart the process 600. The assessment continues until the last testing word of the probe is assessed (630) or when time has expired.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims. For example, various different implementations may switch the functionality of the areas 122, 124, and 126. For instance, the assessor 102 may record a student's response to a target phoneme in area 122 by marking on the associated square space in area 122 where the question is displayed. Additionally, the assessor 102 may indicate an incorrectly pronounced phoneme by selecting the phoneme in the area 124, for example, using input device 106.

These general and specific aspects may be implemented using a system, a method, or a computer program, or any combination of systems, methods, and computer programs.

What is claimed is:

1. A real-time observation assessment system comprising:
one or more processing devices;
one or more storage devices storing instructions that, when executed by the one or more processing devices, cause the one or more processing devices to implement:
an assessment application configured to enable an assessor to administer a probe to a student and to capture responses of the student;
a user interface of the assessment application that includes:
a first area of the user interface that displays a character sequence that is divided into multiple segments, where at least two of the multiple segments of the character sequence are separately selectable by the assessor using an input device; and
a second area of the user interface that is divided into multiple segments that collectively correspond to an aggregation of the multiple segments of the character sequences, with individual constituent segments of the second area corresponding to segments of the character sequence in the first area,
wherein each segment in the second area is separately selectable by the assessor using the input device to capture different combinations of student responses; and a scoring module configured to calculate a score based on the selected segments according to scoring rules for the probe.

2. The system of claim 1 wherein the one or more processing devices and the one or more storage devices form part of a mobile computing device.

3. The system of claim 1 further comprising a third area of the user interface that displays one or more selectable segment responses that correspond to combinations of student responses input in the second area of the user interface.

4. The system of claim 3 wherein:
a selection in the third area of a displayed selectable segment response causes a previously captured response to be undone, and
the scoring module recalculates the score.

5. The system of claim 1 wherein the probe includes a phoneme segmentation fluency probe.

6. The system of claim 1 wherein the probe includes a nonsense word fluency probe.

7. The system of claim 1 where in the first area of the user interface displays one or more markings of the segments of the character sequence that correspond to the combinations of student responses input in the second area of the user interface.

8. The system of claim 1 wherein the second area of the user interface enables the assessor to capture a student response that blends segments.

9. The system of claim 1 wherein the second area of the user interface enables the assessor to capture a student response that repeats selection of a same segment more than once.

10. The system of claim 1 wherein the second area of the user interface enables the assessor to capture a student response that repeats selection of all segments of the character sequence.

11. The system of claim 1 wherein a selection of a segment in the first area visually changes the segment to indicate an incorrect response.

12. The system of claim 1 wherein a selection of a previously selected segment causes a previously captured response to be undone and the score to be recalculated.

13. The system of claim 1 wherein the character sequence is a word and the segments represent a phonetic breakdown of the word.

14. The system of claim 1 wherein each segment is selectable.

15. A method for performing a real-time observation assessment, the method comprising:
displaying an assessment application that is configured to enable an assessor to administer a probe to a student and to capture responses of the student;
providing a first area of a user interface that displays a character sequence that is divided into multiple segments, where at least two of the multiple segments of the character sequence are separately selectable by the assessor using an input device;
providing a second area of the user interface that is divided into multiple segments that collectively correspond to an aggregation of the multiple segments of the character sequences, with individual constituent segments of the second area corresponding to segments of the character sequence in the first area,
wherein each segment in the second area is separately selectable by the assessor using the input device to capture different combinations of student responses; and
automatically calculating a score based on the selected segments according to scoring rules for the probe.

16. The method as in claim 15 wherein displaying the assessment application includes displaying the assessment application on a mobile computing device.

17. The method as in claim 15 further comprising providing a third area of the user interface that displays one or more selectable segment responses that correspond to combinations of student responses input in the second area of the user interface.

18. The method as in claim 17 further comprising:
receiving a selection in the third area of a displayed selectable segment response that causes a previously captured response to be undone; and
automatically recalculating the score.

19. The method as in claim 15 wherein the probe includes a phoneme segmentation fluency probe.

20. The method as in claim 15 wherein the probe includes a nonsense word fluency probe.

21. The method as in claim 15 where in the first area of the user interface displays one or more markings of the segments of the character sequence that correspond to the combinations of student responses input in the second area of the user interface.

22. The method as in claim 15 wherein the second area of the user interface enables the assessor to capture a student response that blends segments.

23. The method as in claim 15 wherein the second area of the user interface enables the assessor to capture a student response that repeats selection of a same segment more than once.

24. The method as in claim 15 wherein the second area of the user interface enables the assessor to capture a student response that repeats selection of all segments of the character sequence.

25. The method as in claim 15 wherein a selection of a segment in the first area visually changes the segment to indicate an incorrect response.

26. The method as in claim 15 wherein a selection of a previously selected segment causes a previously captured response to be undone and the score to be recalculated.

27. The method as in claim 15 wherein the character sequence is a word and the segments represent a phonetic breakdown of the word.

28. The method as in claim 15 wherein each segment is selectable.

29. A machine-accessible medium that when accessed, results in a machine performing operations for enabling an assessor to perform a real-time observation assessment, the operations comprising:
displaying an assessment application that is configured to enable an assessor to administer a probe to a student and to capture responses of the student;
providing a first area of a user interface that displays a character sequence that is divided into multiple segments, where at least two of the multiple segments of the character sequence are separately selectable by the assessor using an input device;
providing a second area of the user interface that is divided into multiple segments that collectively correspond to an aggregation of the multiple segments of the character sequences, with individual constituent segments of the second area corresponding to segments of the character sequence in the first area,
wherein each segment in the second area is separately selectable by the assessor using the input device to capture different combinations of student responses; and
automatically calculating a score based on the selected segments according to scoring rules for the probe.

30. The machine-accessible medium of claim 29 wherein displaying the assessment application includes displaying the assessment application on a mobile computing device.

31. The machine-accessible medium of claim 29 further comprising providing a third area of the user interface that displays one or more selectable segment responses that correspond to combinations of student responses input in the second area of the user interface.

32. The machine-accessible medium of claim 31 further comprising:

receiving a selection in the third area of a displayed selectable segment response that causes a previously captured response to be undone; and automatically recalculating the score.

33. The machine-accessible medium of claim 29 wherein the probe includes a phoneme segmentation fluency probe.

34. The machine-accessible medium of claim 29 wherein the probe includes a nonsense word fluency probe.

35. The machine-accessible medium of claim 29 where in the first area of the user interface displays one or more markings of the segments of the character sequence that correspond to the combinations of student responses input in the second area of the user interface.

36. The machine-accessible medium of claim 29 wherein the second area of the user interface enables the assessor to capture a student response that blends segments.

37. The machine-accessible medium of claim 29 wherein the second area of the user interface enables the assessor to capture a student response that repeats selection of a same segment more than once.

38. The machine-accessible medium of claim 29 wherein the second area of the user interface enables the assessor to capture a student response that repeats selection of all segments of the character sequence.

39. The machine-accessible medium of claim 29 wherein a selection of a segment in the first area visually changes the segment to indicate an incorrect response.

40. The machine-accessible medium of claim 29 wherein a selection of a previously selected segment causes a previously captured response to be undone and the score to be recalculated.

41. The machine-accessible medium of claim 29 wherein the character sequence is a word and the segments represent a phonetic breakdown of the word.

42. The machine-accessible medium of claim 29 wherein each segment is selectable.

\* \* \* \* \*